(12) United States Patent
Itzhak

(10) Patent No.: US 6,365,881 B1
(45) Date of Patent: Apr. 2, 2002

(54) HEATING SYSTEMS BASED ON ALTERNATING-CURRENT ELECTRODES

(76) Inventor: David Itzhak, 32 Rotem Street, Omer 84965 (IL)

( * ) Notice: Subject to any disclaimer, the term of this patent is extended or adjusted under 35 U.S.C. 154(b) by 0 days.

(21) Appl. No.: 09/289,839

(22) Filed: Apr. 12, 1999

Related U.S. Application Data

(63) Continuation of application No. PCT/IL98/00353, filed on Jul. 30, 1998.

(30) Foreign Application Priority Data

Aug. 12, 1997 (IL) .................................................. 121527

(51) Int. Cl.7 ................................................. H05B 1/02
(52) U.S. Cl. ........................ 219/481; 219/494; 392/331; 392/322
(58) Field of Search ................................ 392/338, 312, 392/322, 331, 119; 219/494, 481, 497, 501

(56) References Cited

U.S. PATENT DOCUMENTS

| 4,139,373 A | | 2/1979 | Notton |
|---|---|---|---|
| 4,347,429 A | * | 8/1982 | Will .............................. 219/288 |
| 4,417,132 A | | 11/1983 | Simpson |
| 4,730,098 A | | 3/1988 | Cave |
| 4,959,525 A | * | 9/1990 | Stirling et al. ............... 219/291 |
| 5,607,613 A | | 3/1997 | Reznik |
| 5,652,006 A | | 7/1997 | Assinder et al. |

FOREIGN PATENT DOCUMENTS

IL 120003 1/1997

* cited by examiner

Primary Examiner—Mark Paschall
(74) Attorney, Agent, or Firm—Foley, Hoag & Eliot, LLP

(57) ABSTRACT

A self-protecting heating system comprises an electrically conductive medium, an alternating current source and at least two electrodes. The alternating current source is in contact with at least one electrode at each pole, and the electrodes are in electrical contact with the electrically conductive medium. The electrodes are made of passive metals or passive alloys. The electrically conductive medium may be an aqueous solution or water. The system is preferably provided with a thermostat that disconnects the electrical power from the electrodes once a desired temperature has been reached.

16 Claims, 6 Drawing Sheets

HEATING SYSTEMS BASED ON ALTERNATING-CURRENT ELECTRODES

This application is a continuation of International Application No. PCT/IL98/00353, filed Jul. 30, 1998, hereby incorporated by reference in its entirety, which is based on Israeli Patent Application No. 121,880, filed on Aug. 12, 1997.

This application is based on International Application No. PCT/IL98/00353, filed Jul. 30, 1998, hereby incorporated by reference in its entirety, which is based on Israeli Patent Application No. 121,527 filed on Aug. 12, 1997.

FIELD OF THE INVENTION

The field of the present invention is electrical heating systems, in particular, alternating electrical current heating systems.

BACKGROUND OF THE INVENTION

One of the known systems for heating liquids comprises a heating body which consists of a filament, wrapped in an electrical-insulation layer such as ceramic, which is further wrapped in a encapsulation layer such as stainless steel. The rate of heating in such a heating body is dependent on the rate of heat transmittance of the above layers, and is limited thereto. One disadvantage of such a system is the complexity of said heating body, which determines its relatively high cost. Another disadvantage is the fact that when scale deposits on said heating body, it acts as a thermal insulating layer and thus decreases the efficiency of heating. Another disadvantage of said system is that the filament may overheat and burn if there is no liquid present in the liquid container at the time of operation, or if a sufficient scale layer deposits on said heating body and causes the filament to be substantially thermally insulated from the liquid.

A known system of heating electrically-conductive liquids, such as water, is by applying electrical current through said liquid. Such a system comprises a current source connected to two electrodes, each at one pole thereof, and said electrodes are immersed in said liquid. Said liquids, having a relatively high electrical resistance, act as a resistor and are heated as a result of electrical current passing through them. The above heating system may be carried out by utilizing both direct current (DC) or alternating current (AC). Such a heating system is described, e.g., in U.S. Pat. No. 4,730,098.

One disadvantage of a system in which direct current is applied is, when scale deposits on the electrodes, it constitutes an electrically insulating layer, which cuts off the electrical circuit. Another disadvantage of such a DC system is that when common metals such as copper, iron and zinc are utilized as electrodes in such systems, metal dissolves into the liquid via anodic dissolution. In many applications, such ions are considered to be a contamination.

An advantage of said AC system in comparison with a DC system is that the dissolution of metal ions into the liquid is substantially lower. However, even in AC systems, dissolution of electrodes occurs at a rate which is not acceptable by many applications.

It is an object of the present invention to provide an AC electrode heating system in which the electrodes show high resistance to dissolution into the heated medium.

It is a further object of the present invention to provide a heating system in which the deposition of scale on the electrodes does not interfere with or decrease the efficiency of heating.

It is a further object of the present invention to provide a heating system which is not damaged if the heated medium is absent or in case of the deposition of scale on the heating body.

It is a further object of the present invention to provide an improved water softening system.

It is a further object of the present invention to provide an improved method of purifying water from organic impurities.

The term "scale" as used herein defines a hard incrustation usually rich in calcium and magnesium salts, such as $CaCO_3$, $MgCO_3$ and $Mg(OH)_2$, that is deposited on a heating body during the operation thereof.

A noble metal is a metal that has outstanding resistance to chemical environments and to oxidation even at high temperatures, such as Rhenium, Ruthenium, Rhodium, Palladium, Silver, Iridium, Platinum and Gold.

A passive metal is a metal in a form in which its outer layer has outstanding resistance to reaction with the environment. In case the passive metal is not a noble metal, said outer layer is usually an oxide of said metal. A passive alloy is an alloy in a form in which its outer layer has outstanding resistance to reaction with the environment. Usually, said outer layer is formed by the oxidation of at least one of the alloying metal elements which constitutes the alloy. Said oxide layer of passive metals and passive alloys is not electrically conductive and therefore such a metal cannot be utilized as an electrode in a DC heating system, as described above.

SUMMARY OF THE INVENTION

The present invention relates to a self-protecting heating system which comprises an electrical circuit comprising an alternating current source, at least two electrodes made of passive metals, passive alloys, noble metals or alloys thereof, and electrically-conductive medium wherein two poles of said alternating electrical current source are in electrical contact with at least one electrode at each pole, and said electrodes are both in electrical contact with said electrically-conductive medium.

The present invention further relates to a process of heating which comprises applying alternating electrical current via a circuit as described above.

Said heating process can be applied in numerous processes that require heating such as evaporating, pyrolysis, defrosting, dissolving, chemical reactions, scaling, pasteurizing and sterilizing.

The present invention further relates to passive metals and passive alloys and noble metals and alloys thereof for use as electrodes in an alternating-current heating system, as described above.

Said heating system optionally further comprises an earthing cable which is in contact with the above-mentioned electrically-conductive medium, or with any other matter which is in direct or indirect physical contact with said alternating current source.

Said electrically-conductive medium is optionally a liquid, preferably an aqueous solution or water.

Said passive metals are preferably chosen from a group consisting of Aluminum, Titanium, Cobalt, Nickel, Niobium, Tantalum, Zirconium, Molybdenum, Chromium, Hafnium, and Tungsten.

Said passive alloys are preferably feritic stainless steels such as AISI 420, AISI 430, austenitic stainless steels such as AISI 304, AISI 316, AISI 321, AISI 347, AISI 904, duplex stainless steels such as ferallium 255, titanium alloys such as grade 1 through grade 12, and aeronautic alloys thereof, cobalt base super alloys, nickel base super alloys, niobium alloys, tantalum alloys and tungsten alloys.

Said alloys of noble metals are preferably Gold-Silver-Copper alloys, Gold-Silver-Platinum alloys, Gold-Copper alloys, Gold-Platinum alloys, Gold-Palladium alloys, Palladium-Platinum alloys and Palladium-Copper alloys.

Said heating system optionally further comprises a thermostat which disconnects the electrical power from the electrodes at a desirable temperature such as the boiling temperature of the heated medium.

DETAILED DESCRIPTION OF PREFERRED EMBODIMENTS

The inventors have found that by utilizing passive metals or passive alloys or noble metals or alloys thereof as electrodes, the dissolution of said metals can be dramatically decreased to such an extent that it is not detected by common means. Thus, it is now realized that such an alternating current heating system can be applied in fields where high levels of cleanliness of the heated medium are desirable (e.g. sulphate<250 ppm; nitrates<1 ppm; nitrites<1 ppm; chlorides<250 ppm; total hardness as calcium carbonate<400 ppm; ammonia<0.5 ppm; chloroform—absent), such as drinking water, other domestic applications and agricultural or medical applications.

Surprisingly, the inventors have further found that when passive metals or passive alloys are utilized as electrodes in AC heating systems, their oxidized layer acts as a heating enhancer.

Surprisingly, the inventors hare further found that when scale deposits on the electrodes, it enhances the efficiency of heating. The scale acts as an electrical resistor and heats up in the above manner. Thus, in an AC system, the rate of heating is not limited in the manner that the above described heating body is dependent on the rate of heat transmittance of its ceramic and stainless steel layers.

The inventors have further found that if there is no liquid present in the liquid container at the time of operation, the electrical circuit is thus opened and no damage is caused to the system. Thus, said system is self-protecting.

The inventors have further found that in an AC system, the rate of scale coagulation and flocculation is greater than in filament heating body systems. Thus, an AC heating system can be utilized as an improved water softener.

The inventors have further found that in an AC system, the heating is rapid to such an extent that organic matter undergoes pyrolytic decomposition, coagulation and flocculation on the electrodes. Later, it is possible to separate said scale by filtration.

Figure 1:
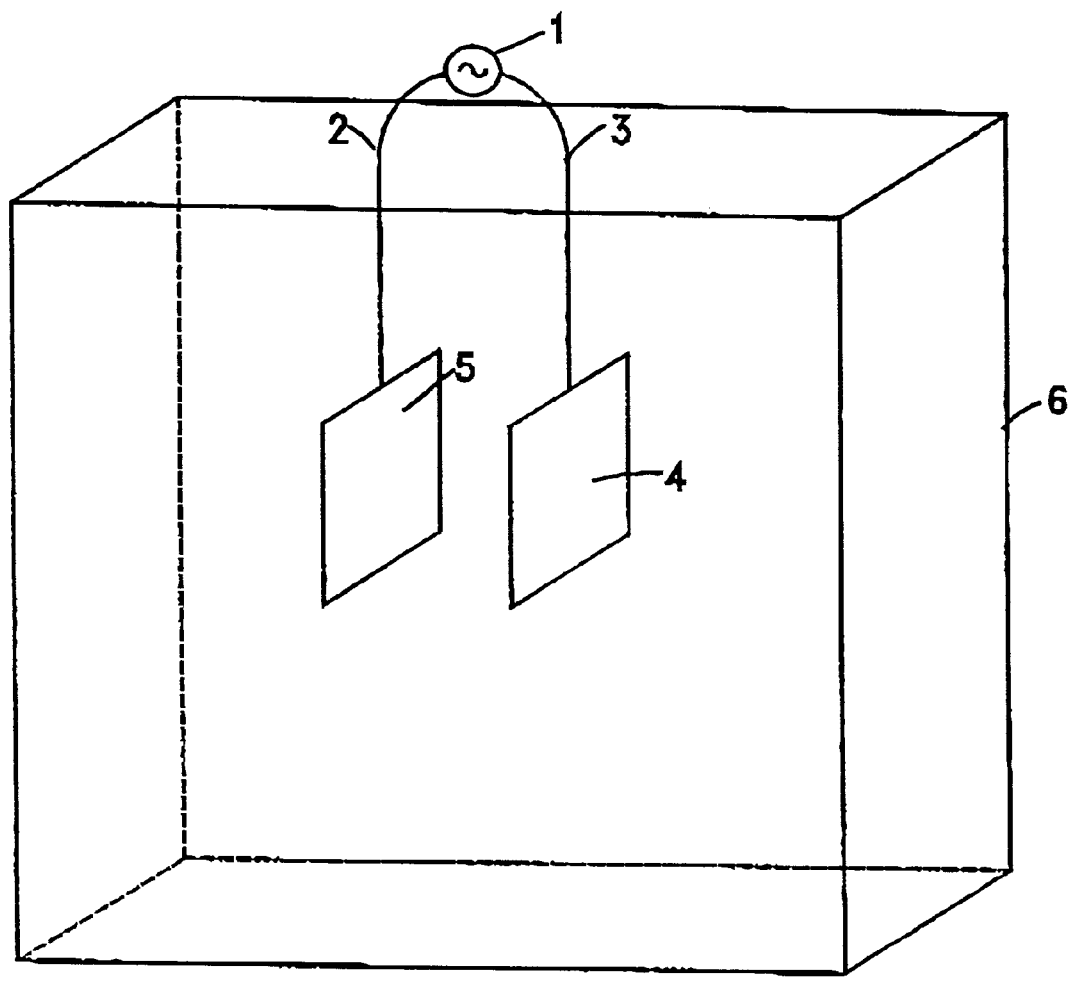
FIG. 1 schematically illustrates an alternating current heating system, according to the invention, in which the electrodes are in the form of two parallel boards.

FIG. 1 schematically illustrates an alternating current heating system according to an embodiment of the invention, in which numeral 1 represents an alternating current source, numerals 2 and 3 both represent electrical wire, numerals 4 and 5 both represent electrodes which are made of passive metals, passive alloys or noble metals or alloys thereof. Numeral 6 represents a container which contains an electrical conductive medium.

Figure 2:
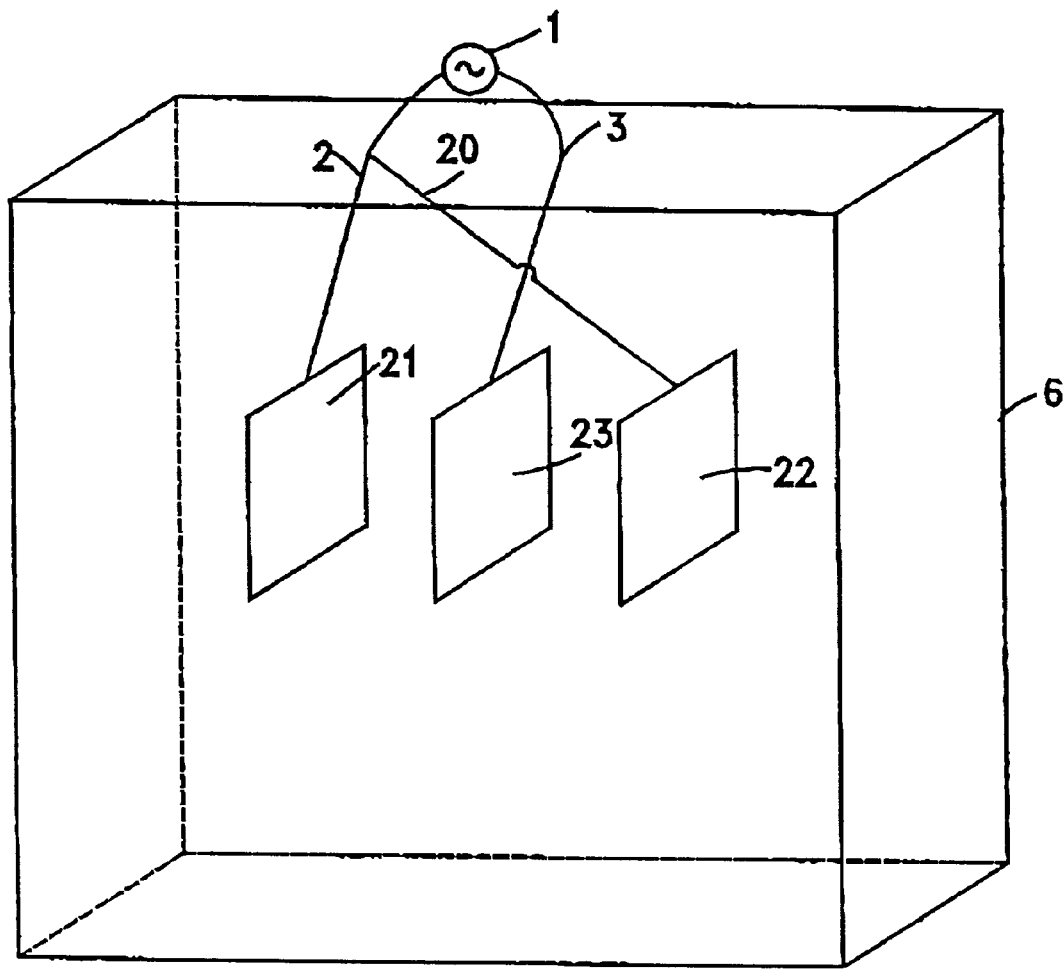
FIG. 2 schematically illustrates an alternating current heating system, according to the invention, in which the electrodes are in the form of three parallel boards.

FIG. 2 schematically illustrates an alternating current heating system according to an embodiment of the invention, in which numeral 1 represents an alternating current source; numerals 2 and 3 represent electrical wires which are connected to the "zero" pole of the AC source, numeral 20 represents an electrical wire which is connected to the "phase" pole of the AC source, numerals 21, 22 and 23 represent electrodes and numeral 6 represents a container which contains an electrical conductive medium.

Figure 3:
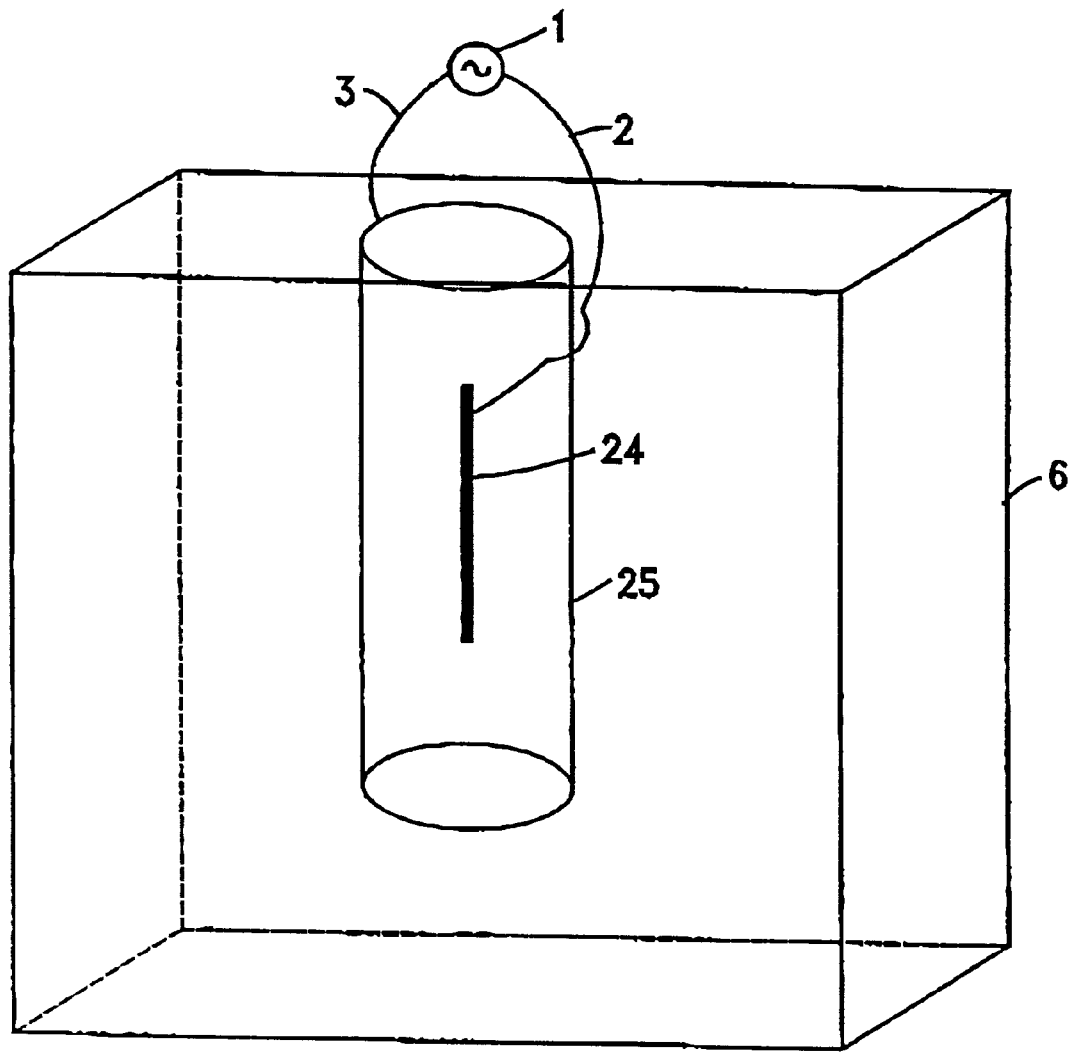
FIG. 3 schematically illustrates an alternating current heating system, according to the invention, in which one electrode is in the form of a rod and the other electrode is in a form of a cylinder, said electrodes being coaxial to one another.

FIG. 3 schematically illustrates an alternating current heating system according to an embodiment of the invention, in which numeral 1 represents an alternating current source, numeral 2 represents an electrical wire which is connected to the "phase" pole of the AC source, numeral 3 represents an electrical wire which is connected to the "zero" pole of the AC source, numerals 24 and 25 each represent electrodes which are coaxial one to another and numeral 6 represents a container which contains an electrical conductive medium.

Figure 4:
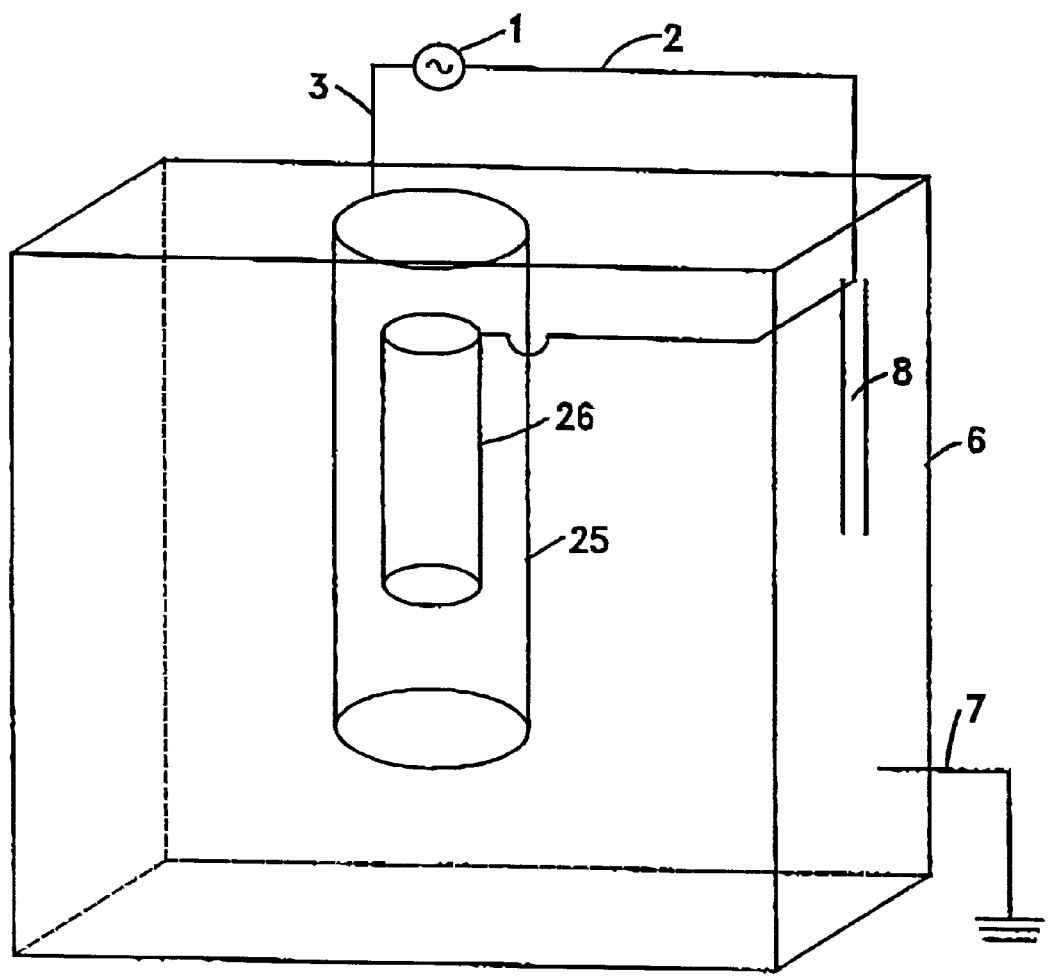
FIG. 4 schematically illustrates an alternating current heating system, according to the invention, in which the electrodes are in the form of two coaxial cylinders, and which further comprises an earthing cable and a thermostat.

FIG. 4 schematically illustrates an alternating current heating system according to an embodiment of the invention, in which numeral 1 represents an alternating current source, numeral 2 represents an electrical wire which is connected to the "phase" pole of the AC source, numeral 3 represents an electrical wire which is connected to the "zero" pole of the AC source, numerals 25 and 26 each represent electrodes which are coaxial one to another, and numeral 7 represents an earthing cable which is in electrical contact with said liquid and with the earth. Numeral 8 represents a thermocouple which is immersed in the liquid and comprises an electrical switch and controls the closure of the electrical circuit, and numeral 6 represents a container which contains an electrical conductive medium.

Figure 5:
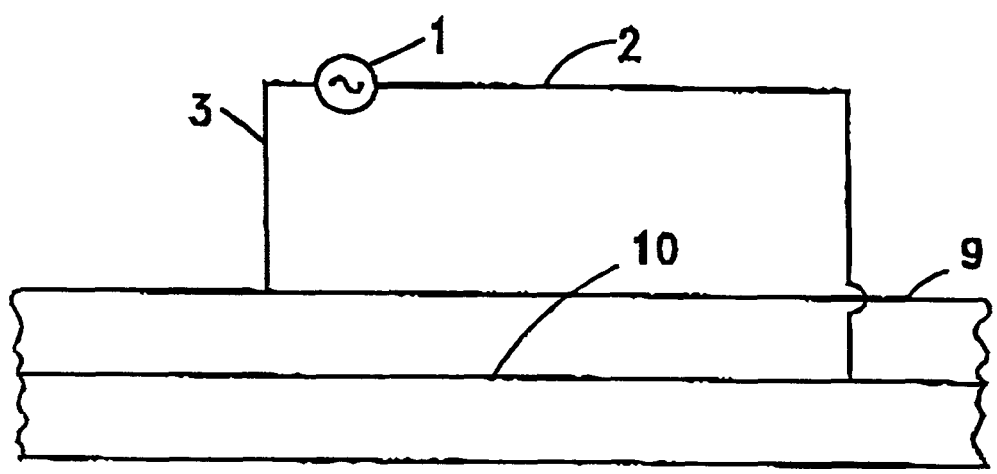
FIG. 5 schematically illustrates a section of an alternating current heating system, according to the invention, in which one of the electrodes is in the form of a pipe and the other electrode is in the form of a wire that is placed in the direction of said pipe.

FIG. 5 schematically illustrates a section of an alternating current heating system in which numerals 1 through 3 are as defined in FIG. 3, numeral 9 represents a pipe through which electrical conductive flowing matter flows. Said pipe is made of passive metals, passive alloys or noble metals or alloys thereof, and thus also acts as an electrode. Numeral 10 represents an electrode made of the above metals or alloys.

Figure 6:
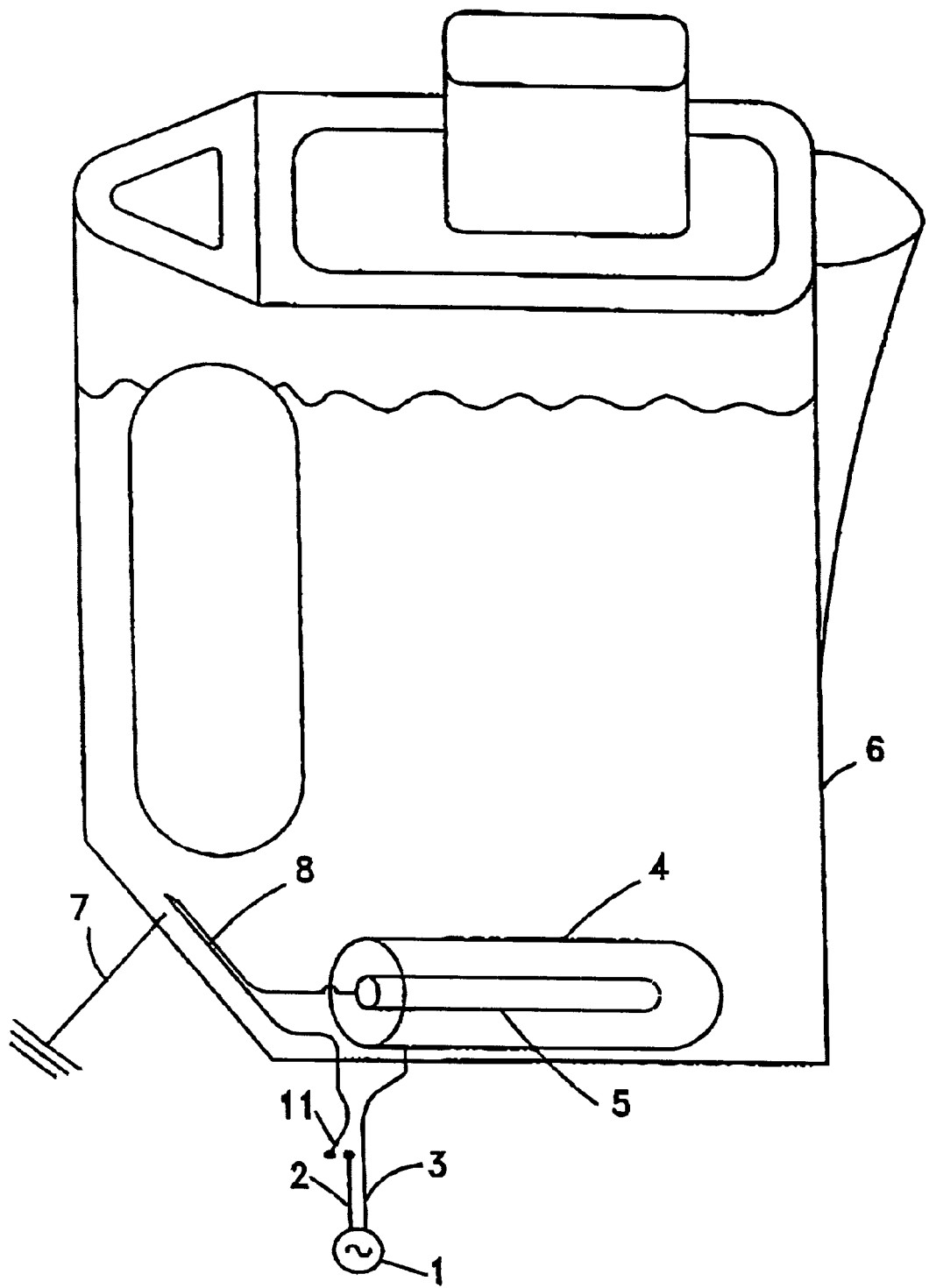
FIG. 6 illustrates in perspective view a domestic AC heating system according to the invention.

FIG. 6 illustrates in perspective view an AC electrode heating kettle according to the invention, in which numerals 1 through 8 are as described above, and numeral 11 represents an electrical switch.

All the descriptions and examples have been given for the purpose of illustration, and are not intended to constitute a limitation of the invention.

EXAMPLES

Example No. 1

1.8 liters of tap water at 22° C. were introduced into a plastic container. Two electrodes made of Titanium grade 7 of an area of 25 cm$^2$ each were immersed thereto, and connected to an AC source of 220V, 50 Hz. The initial current was 10 A. The water boiled at 97° C. after 22 seconds at a current of 17 A.

Example No. 2

5 liters of tap water were introduced into a plastic container. Two electrodes made of Titanium grade 7 of an area of about 25 cm$^2$ each were examined and immersed thereto, and connected to an AC source of 220V, 50 Hz. The initial current was 7 A. The water boiled at 97° C. The boiling was continued for 12 hours, and water was supplied to compensate the loss while boiling. The final current was 17 A. After 12 hours, damages related to anodic dissolution were not observed. A deposition of a layer of scale of about 10 mg/cm$^2$ was indicated.

Example No. 3

5 liters of tap water were introduced into a plastic container. Two electrodes made of Titanium grade 2 of an area of about 25 cm$^2$ each were examined and immersed thereto, and connected to an AC source of 220V, 50 Hz. The initial current was 7 A. The water boiled at 97° C. The boiling was continued for 12 hours, and water was supplied to compensate the loss while boiling. After 12 hours there was no substantial corrosive damage caused to the electrodes. The final current was 17 A. After 12 hours, damages related to anodic dissolution were not observed. A deposition of a layer of scale of about 10 mg/cm$^2$ was indicated. Some coloring of the electrodes was registered.

Example No. 4

0.5 liters of industrial water containing around 1% organic acids, including fumaric acid, were introduced to a plastic container. Two electrodes made of Titanium grade 7 were immersed thereto and connected to an AC source of 220V, 50 Hz. The solution boiled and 450 ml. of liquid were evaporated in that manner. A rough solid suspension coagulated, and was separated from the aqueous solution by filtration.

Example No. 5

4 liters of tap water were introduced to a stainless steel container Two electrodes made of Titanium grade 7 of an area of 100 cm$^2$ each were immersed thereto, and connected to an AC source of 220V, 50 Hz. The initial current was 10 A. The water boiled at 97° C. after between 50 and 60 seconds at a current of 23 A.

Example No. 6

4 liters of tap water were introduced to a stainless steel container Two electrodes made of commercial grade Al 1100 of an area of 100 cm$^2$ each were immersed thereto, and connected to an AC source of 220V, 50 Hz. The initial current was 10 A. The water boiled at 97° C. after between 50 and 60 seconds at a current of 17 A.

Example No. 7

5 liters of tap water were introduced into a plastic container. Two stainless steel 316 electrodes in the shape of a cylinder, one of a diameter of 4 inches and the other of a diameter of 1 inch were placed in a coaxial form and were immersed thereto, and connected to an AC source of 220V, 50 Hz. The water boiled at 97° C. The electrical potential between the water near the walls of the container and the earth was measured and found as 0 V.

What is claimed is:

1. A self-protecting heating system, which comprises an alternating current source having two poles, at least two electrodes made of material chosen from the group consisting of passive metals, which are metals covered with an oxide of the metal, and passive alloys, which are alloys covered with a layer of one of the metal elements which constitute the alloy, and an electrically-conductive medium, wherein the two poles of said alternating electrical current source are in electrical contact with at least one of the electrodes at each of the poles and said electrodes are both in electrical contact with said electrically-conductive medium.

2. A self protecting heating system as described in claim 1 which further comprises an earthing cable which is in contact with the above-mentioned electrically-conductive medium, or with any other matter which is in direct or indirect physical contact with said alternating current source.

3. A self protecting heating system as described in any one of claims 1 or 2, in which the electrically-conductive medium is a liquid.

4. A self protecting heating system as described in claim 3 in which the liquid is an aqueous solution or water.

5. A self protecting heating system as described in claim 1, which further comprises a thermostat which disconnects the electrical power from the electrodes at a desirable temperature.

6. A self protecting heating system as described in claim 5 wherein said desirable temperature is the boiling point of the heated medium.

7. A self protecting heating system as described in claim 1, in which the passive metals are selected from the group consisting of Aluminum, Titanium, Cobalt, Nickel, Niobium, Tantalum, Zirconium, Molybdenum, Chromium, Hafnium, and Tungsten.

8. A self protecting heating system as described in claim 1, in which the passive alloys are selected from the group consisting of feritic stainless steels, austenitic stainless steels, duplex stainless steels, titanium alloys, cobalt base super alloys, nickel base super alloys, niobium alloys, tantalum alloys, tungsten alloys and zirconium alloys.

9. A self protecting heating system as described in claim 1, in which the passive alloys are selected from the group consisting of AISI 420, AISI 480, AISI 304, AISI 316, AISI 321 347, AISI 904, ferallium 255, Titanium grade 1 through grade 12, and Titanium aeronautic alloys.

10. A self-protecting heating system as described in any one of claims 1 to 9 for use as heaters in kettles, boilers, washing machines, dishwasher, water softeners, quick water heaters, evaporators, radiators, steam generators, steam irons, steam cleaners, module water heaters, scale removers, heating boosters, thermal convectors, greenhouse heaters, soil heaters and central heating systems.

11. Process of heating which comprises causing electrical contact between at least one electrode made of material chosen from the group consisting of passive metals, which are metals covered with an oxide of the metal, and passive alloys, which are alloys covered with a layer of one of the metal elements which constitute the alloy, to each pole of an alternating electrical current source, and further causing electrical contact between said at least ones electrodes and an electrically-conductive medium.

12. Passive metals for use as electrodes in an alternating-current heating system, as described in claim 11.

13. Passive metals selected from the group consisting of Aluminum, Titanium, Cobalt, Nickel, Niobium, Tantalum, Zirconium, Molybdenum, Chromium, Hafnium, and Tungsten for use as electrodes in an alternating-current heating system, as described in claim 11.

14. Passive alloys for use as electrodes in an alternating-current heating system, as described in claim 11.

15. Passive alloys selected from the group which consists of feritic stainless steels, austenitic stainless steels, duplex stainless steels, titanium alloys, cobalt base super alloys, nickel base super alloys, niobium alloys, tantalum alloys, tungsten alloys and zirconium alloys for use as electrodes in an alternating-current heating system, as described in claim 11.

16. Passive alloys selected from the group consisting of AISI 420, AISI 430, AISI 304, AISI 316, AISI 321 347, AISI 904, ferallium 255, Titanium grade 1 through grade 12, and Titanium aeronautic alloys for use as electrodes in an alternating-current heating system, as described in claim 11.

* * * * *